(12) United States Patent
Zhang et al.

(10) Patent No.: US 8,341,149 B2
(45) Date of Patent: Dec. 25, 2012

(54) RANKING WITH LEARNED RULES

(75) Inventors: Jianping Zhang, Falls Church, VA (US); Brent M. Han, Fairfax, VA (US); Ali R. Hadjarian, Arlington, VA (US)

(73) Assignee: The Mitre Corporation, McLean, VA (US)

( * ) Notice: Subject to any disclaimer, the term of this patent is extended or adjusted under 35 U.S.C. 154(b) by 477 days.

(21) Appl. No.: 12/340,168

(22) Filed: Dec. 19, 2008

(65) Prior Publication Data

US 2010/0161526 A1    Jun. 24, 2010

(51) Int. Cl.
*G06F 17/30*    (2006.01)
(52) U.S. Cl. ........................................... 707/727
(58) Field of Classification Search .................. 707/727
See application file for complete search history.

(56) References Cited

U.S. PATENT DOCUMENTS

| | | | |
|---|---|---|---|
| 6,782,377 B2 | 8/2004 | Agarwal et al. | |
| 7,349,919 B2 * | 3/2008 | Russell et al. | 1/1 |
| 2002/0138492 A1 * | 9/2002 | Kil | 707/100 |
| 2004/0172374 A1 | 9/2004 | Forman | |
| 2007/0136220 A1 | 6/2007 | Sakurai | |

OTHER PUBLICATIONS

Ling Zhuang et al., "Parameter Optimization of Kernel-based One-Class Classifier on Imbalance Learning", Journal of Computers, vol. 1, No. 7, Oct./Nov. 2006, 2006, pp. 32-40.

Jianping Zhang et al., "Learning Rules from Highly Unbalanced Data Sets", Proceedings of the Fourth IEEE International Conference on Data Mining (ICDM'04), 4 pages.

Taghi M. Khoshgoftaar et al., "An Empirical Study of Learning from Imbalanced Data Using Random Forest", 19th IEEE International Conference on Tools with Artificial Intelligence, 2007, pp. 310-317.

Longbing Cao, et al., "Mining Impact-Targeted Activity Patterns in Imbalanced Data", IEEE Transactions on Knowledge and Data Engineering, vol. 20, No. 8, Aug. 2008, pp. 1053-1066.

Jianping Zhang et al., "kNN Approach to Unbalanced Data Distributions: A Case Study involving Information Extraction", Workshop on Learning from Imbalanced Datasets II, ICML, Washington DC, 2003, 7 pages.

* cited by examiner

*Primary Examiner* — Rehana Perveen
*Assistant Examiner* — Alexander Khong
(74) *Attorney, Agent, or Firm* — Sterne, Kessler, Goldstein & Fox, P.L.L.C.

(57) ABSTRACT

Systems, methods and computer program products for the ranking of a target data set based on learned rules are disclosed. One embodiment is a method that includes generating a learned rule set from a training data record set, creating at least one prototype for each rule in the learned rule set to generate a prototype set, and ranking the target data record set using learned rule set and the prototype set. The generating of a learned rule set includes dividing the training data record set to a positive class and a negative class, and deriving the learned rule set for the positive class. Learning of rules includes deriving the most general projected rules with respect to remaining training data and then refining those rules, eventually selecting the best rules using an F-measure.

23 Claims, 7 Drawing Sheets

RANKING WITH LEARNED RULES

BACKGROUND OF THE INVENTION

1. Field of the Invention

The present invention relates generally to ranking lists of data items, and more particularly to ranking lists of data items using inductively learned rules.

2. Background Art

Numerous applications require the examination of a large amount of data to isolate a relatively small number of events that can be subject to further analysis. Fraud detection in transactions including credit card transactions, fraud detection in corporate accounting activity, customer pattern identification using purchase records, extracting security information based on surveillance records, etc., are some of the applications that subscribe to a model of sifting through a large amount of data to isolate and further analyze a few highly suspect instances.

In an application for fraud detection that uses records of credit card transactions, for example, hundreds of millions of transaction records may be available in a predetermined format that is amenable to processing by a computer. In general, only a relatively small number of transactions are fraudulent. However, often there is no clear criteria by which fraud can be detected with certainty. Often, what is required is a deeper analysis of customer transaction patterns and other related factors, and such deeper analysis is practical only after a relatively small subset of transaction records are identified as possibly fraudulent.

Manually ranking such a large amount of data is tedious, error-prone and cost-prohibitive. Automated ranking using computer-implemented methods, e.g. neural networks and support vector machines, are available, but models generated using these methods are not human understandable, which often is a key requirement in many applications. Among all classification/ranking models, rules are the most human understandable. Rule induction algorithms have been successfully applied to many classification problems, but rules are generally not used for ranking.

Therefore, effective methods, systems and computer program products for automated ranking of data records using rules are needed.

BRIEF SUMMARY OF THE INVENTION

The present invention is directed to system, method and computer program product embodiments for the ranking of data using learned rules. In one embodiment, the present invention is a computer-implemented method for ranking a target data record set. The method includes generating a learned rule set from a training data record set, creating at least one prototype for each rule in the learned rule set to generate a prototype set, and ranking the target data record set using the learned rule set and the prototype set. The rule set is generated from the training data record set, which includes a positive class and a negative class. Rules are then generated for the positive class.

In another embodiment, learning of rules includes forming a projected rule that is substantially the most general, adding the projected rule to a set of projected working rules, refining each of a plurality of rules in the set of projected working rules by adding one or more of a condition or a range restriction, filtering to retain only a predetermined number of rules in said set of projected working rules, and selecting the projected rule that has the highest F-measure from the set of projected working rules as a learned rule.

Another embodiment is a system for ranking a target data set that includes a rule learning module configured to generate a learned rule set from a training data record set, a rule prototype generation module configured to create at least one prototype for each rule in the learned rule set, to generate a prototype set, and a scoring module configured to rank the target data record set using the learned rule set and the prototype set.

Yet another embodiment is a computer program product for enabling a processor to rank a target data set. The computer program product includes a rule learning module configured to enable the processor to generate a learned rule set from a training data record set, a rule prototype generation module configured to enable the processor to create at least one prototype for each rule in the learned rule set to generate a prototype set, and a scoring module configured to enable the processor to rank the target data record set using the learned rule set and the prototype set.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Figure 1:
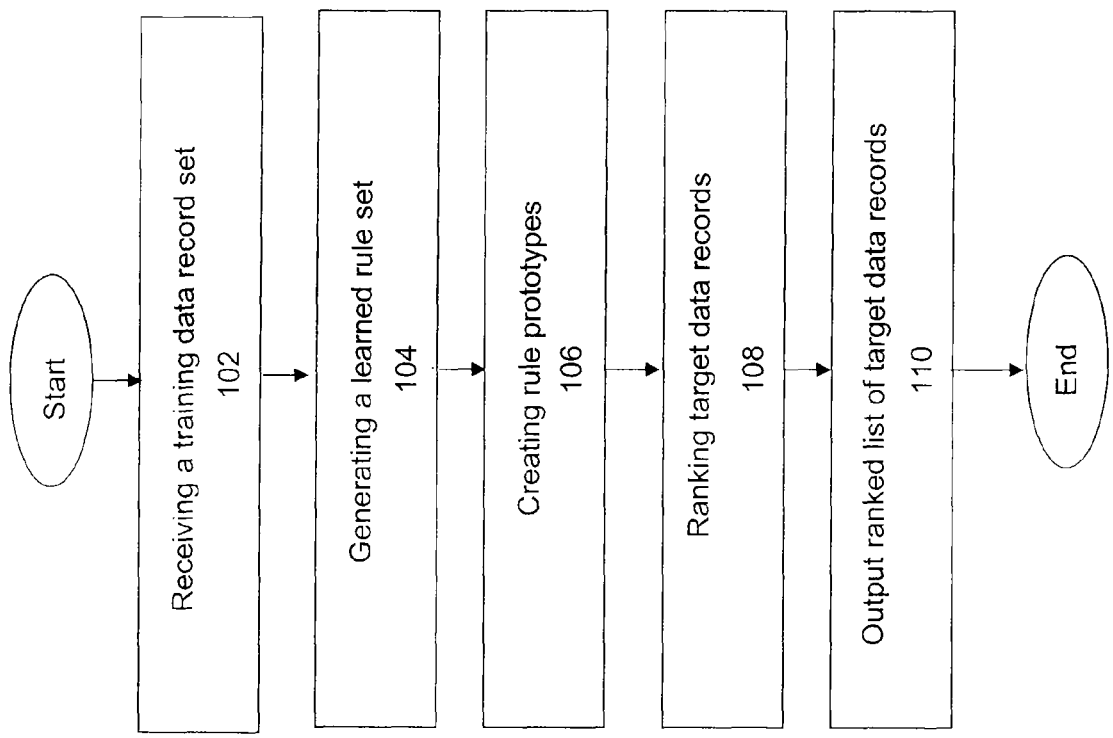
FIG. 1 is a process to rank a set of target data records, according to an embodiment of the present invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

1. Overview

The present invention relates to the analysis of data using rules learned from sample training data. More particularly, the present invention enables the ranking of data records based on rules learned from training data.

Embodiments of the present invention can be used, for example, in ranking a list of suspicious entities so that the most suspicious entities can be identified for further analysis. An example may involve the analysis and ranking of millions of credit card transactions to identify the highly suspicious transactions. The ranking can be based on rules that are automatically learned from a suitable set of credit card transactions that have been previously classified and labeled as to the nature (e.g., fraudulent or valid) of each transaction. Other example applications can include identification of suspicious securities transactions, identification of corporate activity based on corporate securities filings, identification of suspicious bank transactions, etc. However, the invention is not limited to these examples Embodiments of the present invention learn a set of rules from a training data set. Training data sets, for example, for the applications mentioned above, are intended to reflect real data collections and are generally skewed towards a highly unequal distribution of classes, i.e., they yield unbalanced data distributions. As an example, when considering a large number of credit card transactions, fraudulent transactions are usually a small percentage of the total transactions. In contrast to conventional rule induction methods, the embodiments herein are oriented to focus on fraudulent transactions of the training data records set, thereby yielding a more effective set of rules with which to analyze an unlabeled set of transactions. While conventional rule learning methods select rules based on an accuracy metric that may not be effective in unbalanced data distributions, embodiments of the present invention use the F-measure that considers all the training data while focusing on the highly relevant class of training data records.

The learned rules are used, in embodiments of the present invention, to rank the target set of transactions (target data records). For example, the rules may be used to rank the fraudulent transactions in order of importance. In contrast to most conventional rule-based ranking methods that use statistics information of rules to rank data records, embodiments of the present invention use a prototype approach that enables a higher granularity of scoring which may result in target data records covered by the same rules having different scores based on the proximity of the data record to each prototype of the rule.

Embodiments of the present invention are particularly suited for environments where it is desired that a relatively small number of data records (compared to the total number of data records) are identified and ordered with a high level of precision. Embodiments of the present invention are also particularly suited for environments where the data distribution is substantially unbalanced.

In the following description, embodiments of the present invention are described with frequent references to an example application for detecting and ranking fraudulent credit card transactions (hereafter, credit card transaction application). A person skilled in the art will understand, however, that the teachings provided herein are applicable to numerous other applications where data is required to be analyzed and ranked based on learned rules.

The term "training data" is used herein to describe data (sometimes preprocessed) that is suitable for learning a set of classification rules for a specific application. The term "target data" is used to describe the data that needs to be analyzed and ranked. In the example credit card transaction application, the training data can include one record per transaction. Each record may have multiple attributes, including, for example, vendor, amount, type of transaction, data and time of transaction, relationships to previous transactions by the same credit card owner, relationships to transactions for the same vendor, relationships to transactions of the same type, previous behavior of credit card owner, and a label attribute indicating whether the record is considered to actually represent a fraudulent transaction or a non-fraudulent transaction. A data record is covered by a rule if all conditions of the rule are satisfied by attribute values of the record.

Example embodiments for analysis and ranking of data sets according to the present invention are described in the following sections.

2. Method for Rule-Based Ranking

FIG. 1 illustrates a process, according to an embodiment of the present invention that can be used to rank a target data set using rules learned from a training data set. As noted previously, for purposes of description, an example application that involves the analysis and ranking of credit card transactions for suspected fraud will be followed in the description as appropriate.

In step 102, a training data record set is received. In an embodiment, the training data set is a set of preprocessed records having a predefined format. Each record in the training data set generally contains multiple attributes. The training data records have been preprocessed to classify them into two or more classes of records.

Considering the example of the credit card transaction application, each record in the training set may correspond to a single credit card transaction. The predefined attributes in the record can include basic information of a transaction such as name of credit card holder, vendor name, type of purchase, amount, date and time of transaction, etc. In addition to the basic information of a transaction, attributes may also include derived information such as the relationship of the transaction to previous transactions of the same type of purchase, relationship of the transaction to previous transactions with the same vendor, relationship of the transaction to other transactions, information relating to the financial profile of the credit card holder, information relating to selected demographics of the credit card owner, information relating to the other purchasers of the type of purchase, etc. There are numerous attributes, including but not limited to those above, that can be available and useful for various applications.

The attributes of the records can be determined based on any number of criteria that is relevant to each specific target application. In the example credit card transaction application, the basic transaction data and any other data that can help infer the validity or potential fraudulence of a transaction may be included in the set of attributes. Having a larger number of attributes is helpful to have more available information that can be analyzed to draw conclusions. However, a larger number of attributes can also lead to higher processing costs and other inefficiencies.

In addition to the attributes in the record that define the transaction and various related transaction patterns, the training data records are also labeled. The label can be implemented as an attribute in each record, or in another manner. The label indicates the class in which the particular record is to be considered. For example, in the credit card transaction application, the label would indicate if the transaction is considered valid or fraudulent.

Select embodiments of the present invention expect two classes of data in the training set. Following the example credit card transaction application, for example, the two classes can be "fraudulent transactions" and "valid transactions." In general, the positive class refers to records that are of interest and that should be subject to further detailed analysis, and the negative class refers to other records. In the example credit card transaction application, the positive class would comprise the fraudulent transactions while the negative class would comprise the valid transactions.

In step 104, the received set of training data records is used to generate a set of rules. The rules generated in step 104 can be generated using a process of inductive learning. A "rule" can be considered a conjunction of conditions. A "condition" is a relationship of the form A=V, where A is an attribute and V is a value corresponding to A. If A is a symbolic attribute, V would be a nominal value of that symbolic attribute. If A is a numeric attribute, then V would be an interval value for that numeric attribute. In one embodiment, a rule can imply that all records that are covered by the rule can belong to the positive class.

For example, a rule used in the credit card transaction application can be, transaction_amount=(10000 . . . 50000) AND type_of_purchase=CLOTHING AND annual_income=(0 . . . 100000), that can be translated to indicate that a record is potentially fraudulent if it represents transaction amount between $10000-$50000 spent on clothing by a credit card holder whose annual income is no greater than $100000. The attribute type_of_purchase is a symbolic attribute and the corresponding value CLOTHING is a symbolic value. The attributes transaction_amount and annual_income are numeric attributes and the corresponding values are numeric ranges.

Embodiments of the present invention use an iterative general-to-specific process of deriving a most general rule for a given set of training data records, and then narrowing (refining) the derived rule. The process of rule generation is repeated until no more rules can be generated that satisfy predefined criteria. The output of the rule generation process of step 104 is a set of rules that cover all data records in the positive class of the training data records. Further details of the rule generation process, according to an embodiment of the present invention, is described below with respect to FIG. 2.

In step 106, for each rule generated in step 104, one or more rule prototypes are created. In embodiments of the present invention where the training data can be classified into two classes, the number of rule prototypes generated for each rule can be one or two: a positive rule prototype intended for the positive class of data, and a negative rule prototype intended for the negative class of data.

A rule prototype can be considered a point in an m-dimensional feature space where the features correspond to attributes of the rule. m is the number of numeric conditions in the rule. Accordingly, the positive rule prototype approximates the midpoint in the m-dimensional space corresponding to the average of the values for each of the m rule conditions of the training data records in the positive class. The negative rule prototype approximates the midpoint in the m-dimensional space corresponding to the average of the values for each of the m rule conditions of the training data records in the negative class. Further details of rule prototype generation are described with respect to FIG. 4.

In step 108, the target data records are ranked. In embodiments of the present invention, rules and the prototypes generated in step 106 are used to score each of the target data records. Scoring an actual data record covered by a rule based on its proximity to the positive rule prototype and to the negative rule prototype of the rule allows the actual data records to be scored using a range of values. Having scores spanning a continuous range of values allows the set of target data records to be ranked with a relatively high level of score granularity that in turn results in a more granular ranking.

Figure 5:
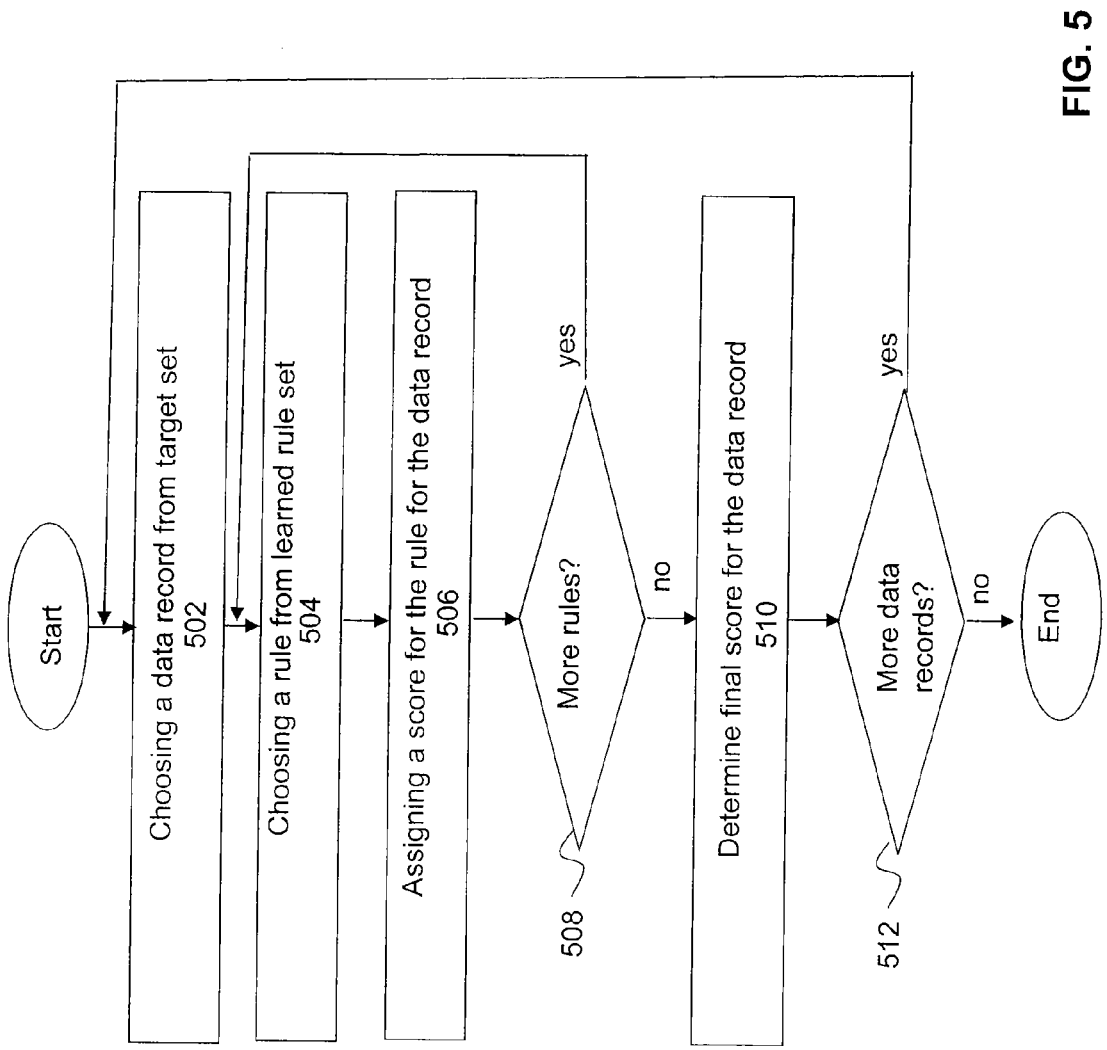
FIG. 5 is a process to assign a score to each data record, according to an embodiment of the present invention.

Further details of scoring are described with respect to FIG. 5.

In Step 110, the ranked list of target data records is output. The output may be to storage, to a display, to a printer, or to any other output mechanism or approach. The output may also be to another process that may further analyze the ranked list of target data records. As described previously, the output list can comprise target data records where the records of most interest are ranked in a relative order of importance. For example, in the credit card transaction example, the output list may list the 1000 transactions that are deemed to be most likely to be fraudulent, ordered according to decreasing likelihood of fraud.

2.1 Learning Rules (Step 104)

Figure 2:
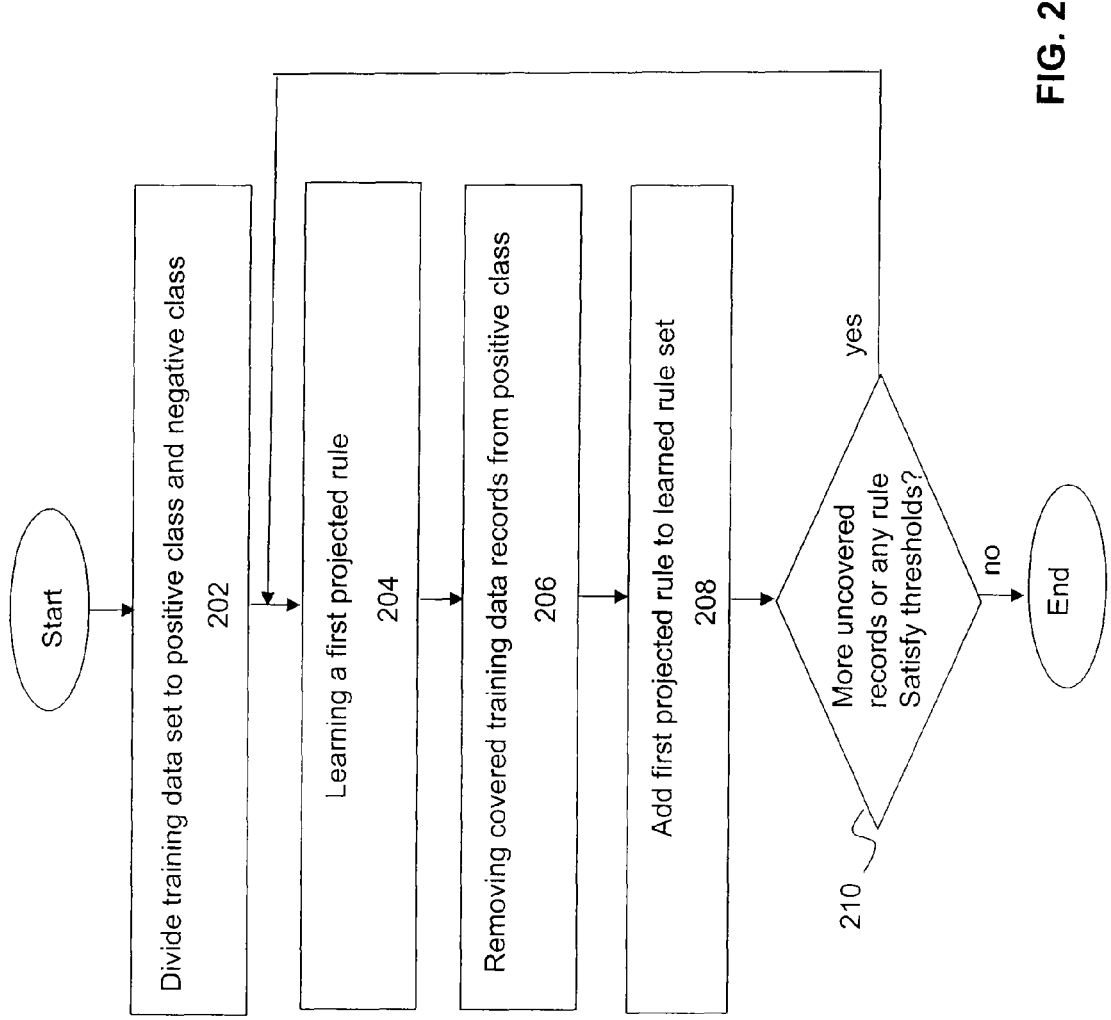
FIG. 2 is a process to learn rules from training data records, according to an embodiment of the present invention.

FIG. 2 illustrates the process of rule learning (corresponding to step 104 of FIG. 1), according to an embodiment of the present invention. Steps 202-210 implement processing to generate a set of rules based on inductive learning from a training data set.

In step 202, the training data records are divided to a positive class of records and a negative class of records. As noted previously, although both classes of training data records are considered, an emphasis is placed on covering all of the records in the positive class. In the example credit card transaction application, rules are generated to cover all of the training data in the positive class.

The division of the records to a positive class and negative class involves, for example, marking a class attribute in each record as positive or negative. In the credit card transaction application, for example, each record can be marked as fraudulent or valid. Training data records marked as fraudulent constitute the positive class and those marked as valid constitute the negative class.

In many embodiments of the present invention, each training data record will include an attribute that indicates its class (e.g., positive or negative). Also, in many embodiments, the marking of the data is performed in a preprocessing stage. For example, the training records may include credit card transactions that have already been verified as to their validity.

In step 204, a rule is formed that covers one or more of the training data records using an iterative process. The processing involved in selecting a rule in each iteration, refining the rule, and testing the rule with respect to quality parameters are described in further detail with respect to FIG. 3.

In step 206, the learned rule (from step 204) is tested against all training data records of the positive class, and each training data record of the positive class that is covered by the rule is removed from the set of training data records. Therefore, in each iteration of steps 204-210, a newly formed rule is tested against the remaining training data records of the positive class, and the covered training data records are removed.

In step 208, the rule formed in step 204 is added to the learned rule set. The learned rule set will subsequently be used to analyze and rank the target data records. In step 210, it is determined whether there are any remaining training data records of the positive class and whether there are any rules that satisfy a predetermined criteria. If both are true, then steps 204-210 are repeated until there are no remaining training data records that belong to the positive class or there are no rules that satisfy the predetermined criteria. The predetermined criteria can include the statistical quality thresholds described below with respect to steps 306-308 of process 204.

When steps 202-210 are completed, a complete rule set has been generated from the training data set based on rule induction.

Figure 3:
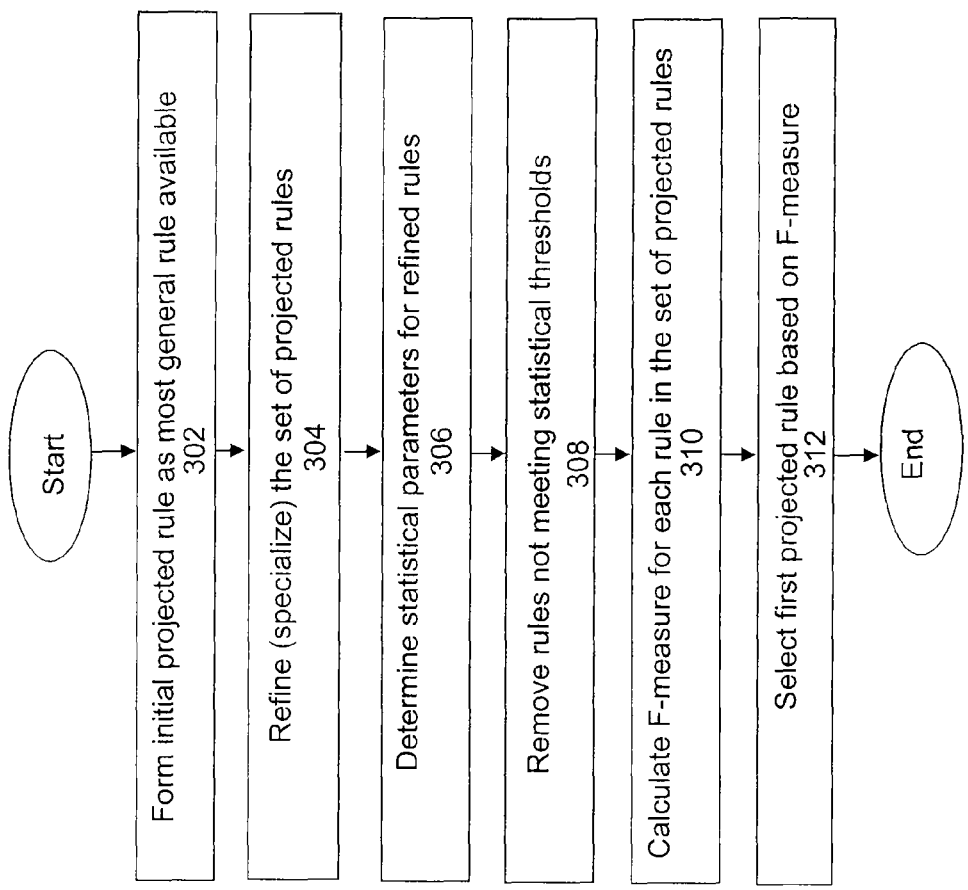
FIG. 3 is a process for generating a rule, according to an embodiment of the present invention.

FIG. 3 (steps 302-312) illustrates the operation of step 204, i.e., the learning of a rule from the training data records, in greater detail. In step 302, an initial projected rule is created. The initial projected rule is created so that it covers substantially the entire feature space, namely it covers all of the training data records in the positive class as well as in the negative class. The initial projected rule is the most general rule.

Note that, in each invocation of step 302, a new initial projected rule is created based on the remaining training data records, and the initial projected rule is added to a set of projected rules. The set of projected rules, therefore, comprises entirely of initial projected rules and the subsequent iterative refinement (in step 304, as described below) of each of the rules.

In step 304, the rules in the set of projected rules, including the initial projected rule, are refined. The refining of a rule includes the addition of conditions or reduction of the range of an existing condition. Usually refinement of a rule produces many different rules, because there are different conditions to be added or different ways to reduce the range of a numeric condition.

In step 306, one or more statistical quality thresholds are evaluated for each of the newly refined rules in the set of projected rules. Any rule that does not satisfy one or more of the quality thresholds is removed from the set of projected rules in step 308. In this manner, at each iteration of steps 302-312, the projected rule set comprises only rules that meet a predetermined level of quality as determined by the quality thresholds.

In an embodiment, two statistical quality thresholds are used: minimum recall, and minimum precision. The recall of a positive class rule is the ratio of the number of positive class training data records covered by the rule to the total number of positive class training data records. The precision of a positive class rule is the ratio of the number of positive class training data records covered by the rule to the total number of training data records (from both the positive and negative classes) covered by that rule. The minimum recall, therefore, is the minimum ratio of the number of positive class training data records covered by the rule to the total number of positive class training data records. The minimum precision, therefore, is the minimum ratio of the number of positive class training data records covered by the rule to the total number of training data records (from both the positive and negative classes) covered by that rule.

In step 310, the rules in the set of projected rules are then ordered according to the F-measure. The F-measure of rule r can be defined mathematically as:

$$F-\text{measure}(r) = \frac{\beta^2 + 1}{\frac{\beta^2}{\text{recall}(r)} + \frac{1}{\text{precision}(r)}}$$

where $\beta$ is a parameter for assigning relative weights to recall and precision. When $\beta$ is set to 1, recall and precision are weighted equally. F-measure favors recall with $\beta > 1$ and favors precision with $\beta < 1$. Specifically, an F-measure with a large $\beta$ value favors more general and less precise rules, while one with a small $\beta$ value favors more specific and precise rules.

Having ordered the rules according to the F-measure in step 310, the best rule, as determined by the F-measure, is selected as the learned rule generated by that iteration of steps 301-312, i.e., step 204. For example, the projected rule with the highest F-measure score is returned as a learned rule.

2.2 Generating Rule Prototypes (Step 106)

Figure 4:
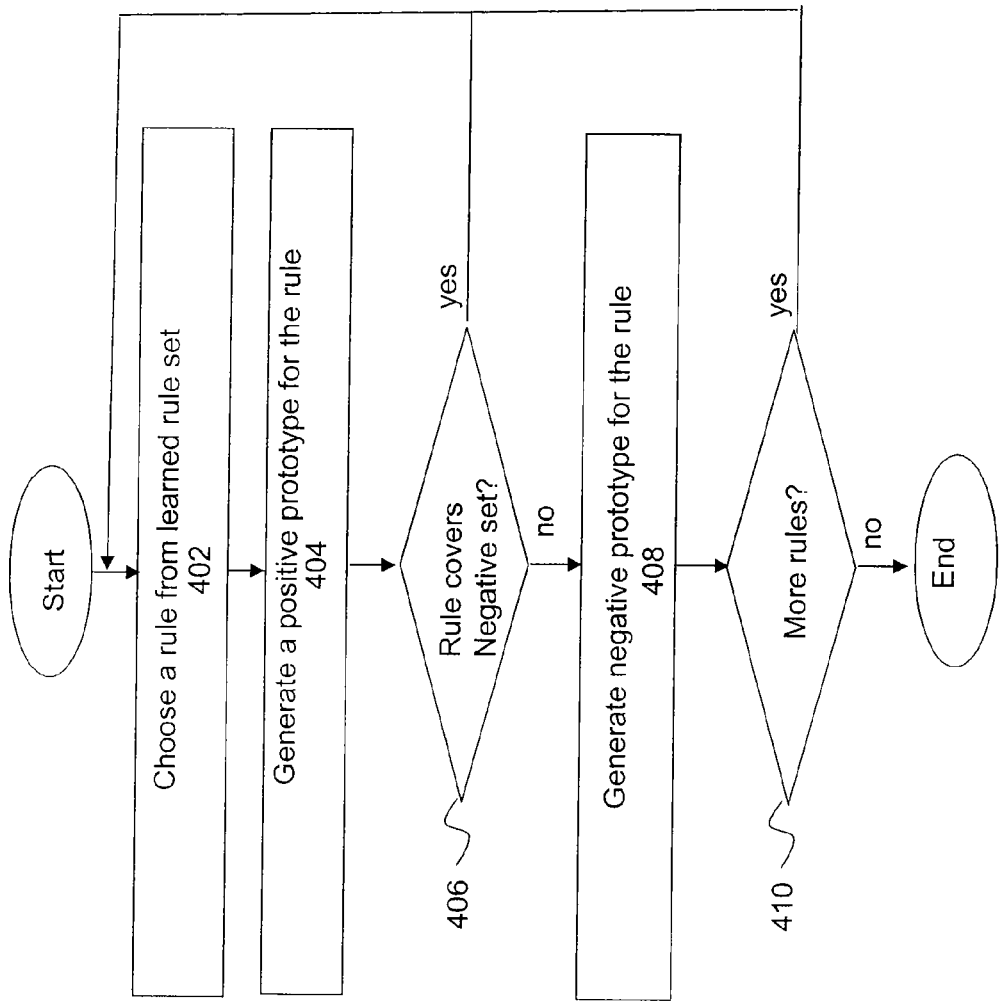
FIG. 4 is a process of generating prototypes for a learned rule, according to an embodiment of the present invention.

FIG. 4 (steps 402-410) illustrates, in greater detail, the processing involved in step 106 to generate rule prototypes, according to an embodiment of the present invention. As noted previously, one or more rule prototypes are generated for each rule in the learned rules set.

In step 402, one rule from the learned rule set is selected for prototype creation. Each rule in the set of learned rules is subjected once to processing in order to create the corresponding rule prototype(s). Rules may be selected for processing in any order, including sequentially in the order that they were added to the learned rule set.

In step 404, a positive rule prototype is generated for the rule selected in step 402. As noted previously a rule prototype is a point in an m-dimensional space, where the dimensions are the attributes involved in a condition of the rule and the point is determined by the respective value of each attribute. The positive rule prototype can be considered as substantially the midpoint of the m-dimensional space covered by the positive class of training data records.

Some of the learned rules cover only training data records in the positive class. In step 406, it is determined whether the selected rule covers any training data records of the negative class. If not, the processing returns to step 402 to select another rule from the learned rule set. If yes, i.e., the selected rule covers training data records of the negative class, then in step 408, a corresponding negative rule prototype is generated. The negative rule prototype can be considered a point in the m-dimensional space corresponding to the negative class of the training data records.

A rule R with m numeric conditions may be represented as $A_{R1} = V_{R1} \hat{} A_{R2} = V_{R2} \hat{} \ldots \hat{} A_{Rm} = V_{Rm}$, where $A_{Ri}$ is a numeric attribute, $V_{Ri}$ is a numeric value (or a numeric range), and $i = 1 \ldots m$. The positive rule prototype of R is $P(R) = (p_{R1}, p_{R2}, \ldots, p_{Rm})$, and the negative prototype of R, $N(R) = (n_{R1}, n_{R2}, \ldots, n_{Rm})$, where $p_{Ri} \in V_{Ri}$ and $n_{Ri} \in V_{Ri}$. The positive rule prototype $p_{Ri}$ and the negative rule prototype $n_{Ri}$ can be represented mathematically as:

$$p_{Ri} = \frac{\sum_{e \in R(POS)} e_{Ri}}{|R(POS)|}$$

$$n_{Ri} = \frac{\sum_{e \in R(NEG)} e_{Ri}}{|R(NEG)|}$$

where R(POS) and R(NEG) are the sets of positive and negative data records covered by R, respectively, $e = (e1, e2, \ldots, en)$ is a training data record, $1 \leq R_i \leq n$, and $e_{Ri} \in V_{Ri}$ for $i = 1, \ldots, m$, because e is covered by R.

In step 410, it is determined if there are any more rules for which rule prototypes must be generated. Steps 402-410 are repeated for each of the rules in the learned rule set. When rule prototypes have been generated for all of the learned rules, the processing involved in step 106 is complete.

2.3 Scoring Rules (Step 108)

FIG. 5 (steps 502-512) illustrates in greater detail the processing involved in step 108 for assigning scores to target data records, according to an embodiment of the present invention.

Steps 502-512 can be used to assign scores to each target data record with respect to all learned rules that cover that target data record.

In step 502, a target data record which has not been assigned a score is selected. In step 504, one rule that covers the selected target data record is picked. In step 506, a score is assigned to the target data record selected in step 502 using the learned rule selected in step 504.

Given a positive prototype $P(R)=(p_{R1}, p_{R2}, \ldots, p_{Rm})$ and a negative prototype $N(R)=(n_{R1}, n_{R2}, \ldots, n_{Rm})$ of a rule R, the score of a target data record $t=(t1, t2, \ldots, tn)$ is 0 if t is not covered by R. Otherwise, t receives a score between 0 and 1 inclusive computed using, for example, the following mathematical formula:

$$\text{score}(t, R) = \text{precision}(R) \frac{\sum_{i=1}^{m} wR_i \frac{|e_{Ri} - n_{Ri}| - |e_{Ri} - p_{Ri}|}{|p_{Ri} - n_{Ri}|} + \sum_{i=1}^{m} wR_i}{2 \sum_{i=1}^{m} wR_i}$$

where precision (R) is the precision of R, $w_{Ri}$ is the weight of the $Ri^{th}$ attribute of R and $1 \leq R_i \leq n$. The value of $$\frac{|e_{Ri} - n_{Ri}| - |e_{Ri} - p_{Ri}|}{|p_{Ri} - n_{Ri}|}$$

is between −1 and 1. When $e_{Ri} > n_{Ri} > p_{Ri}$ or $p_{ri} > n_{Ri} > e_{Ri}$, $$\frac{|e_{Ri} - n_{Ri}| - |e_{Ri} - p_{Ri}|}{|p_{Ri} - n_{Ri}|}$$

is −1. When $e_{Ri} > p_{Ri} > n_{Ri}$ or $n_{Ri} > p_{Ri} > e_{Ri}$, $$\frac{|e_{Ri} - n_{Ri}| - |e_{Ri} - p_{Ri}|}{|p_{Ri} - n_{Ri}|}$$

is 1. When $e_{Ri}$ is closer to $n_{Ri}$ than $p_{Ri}$, $$\frac{|e_{Ri} - n_{Ri}| - |e_{Ri} - p_{Ri}|}{|p_{Ri} - n_{Ri}|}$$

takes a value between −1 and 0. When $e_{Ri}$ is closer to $p_{Ri}$ than $n_{Ri}$, $$\frac{|e_{Ri} - n_{Ri}| - |e_{Ri} - p_{Ri}|}{|p_{Ri} - n_{Ri}|}$$

takes a value between 0 and 1. The value of score (e, R) is normalized to the range of 0 and 1. If $p_{Ri} = n_{Ri}$, then $$\frac{|e_{Ri} - n_{Ri}| - |e_{Ri} - p_{Ri}|}{|p_{Ri} - n_{Ri}|}$$

is set to 0.

$w_{Ri}$ is computed using the following formula:

$$w_{Ri} = \frac{|p_{Ri} - n_{Ri}|}{\max_{Ri} - \min_{Ri}}$$

where $\max_{Ri}$ and $\min_{Ri}$ are the maximum and minimum values of the $Ri^{th}$ attribute of R, respectively. The large difference between $p_{Ri}$ and $n_{Ri}$ implies that the values of the $Ri^{th}$ attribute of positive class target data records are very different from the values of the $Ri^{th}$ attribute of negative class target data records, so the attribute should distinguish positive target data records from negative target data records well.

If only a positive rule prototype is generated for a rule, i.e., because the rule covers only training data records in the positive class, then the score uses only the positive prototype.

In step 508, it is determined whether there are more learned rules to be applied to the selected target data record. If yes, then another learned rule is selected and applied to the same selected data record by iterating over steps 502-508. If no, a final score is determined for the selected target data record in step 510. The final score is based on the individual scores assigned by each of the learned rules that covered the selected target data record.

In determining the final score of a target data record t in step 510, embodiments of the present invention may use various methods, such as, for example, the maximum score, the average score, and the probabilistic sum score. The combined score of t using the "maximum score method" can be computed as:

$$\text{score}(t, RS) = \max_{i=1}^{l} \{\text{score}(t, R_i)\}$$

where $RS = \{R_1 \ldots R_l\}$ is the set of learned rules applied to t, and $\text{score}(t, R_i)$ is the score of t assigned by rule $R_i$.

Similarly, combined score of t using the "average score method" can be computed as:

$$\text{score}(t, RS) = \frac{\sum_{i=1}^{l} \text{score}(t, R_i)}{l}.$$

The "probabilistic sum score method" of computing the combined score of target data record t can be computed as follows:

$$\text{score}(t, \{R_1\}) = \text{score}(t, R_1)$$

$$\text{score}(t, \{R_1, R_2\}) = \text{score}(t, R_1) + \text{score}(t, R_2) - \text{score}(t, R_1)\text{score}(t, R_2)$$

$$\text{score}(t, \{R_1, \ldots, R_n\}) =$$

$$\text{score}(t, \{R_1, \ldots, R_{n-1}\}) + \text{score}(t, R_n) - \text{score}(t, \{R_1 \ldots R_{n-1}\})\text{score}(t, R_n)$$

In general, the average score method and the probabilistic sum score method are found to provide finer grained rankings than the maximum score method.

It should be noted that in the above description, if a target data record t was not covered by rule $R_i$, then the resulting score $\text{score}(t, R_i) = 0$. However, other methods of assigning scores for partial coverage of t by rule $R_i$ are envisioned in embodiments of the present invention.

3. Rule-Based Ranking System

Figure 6:
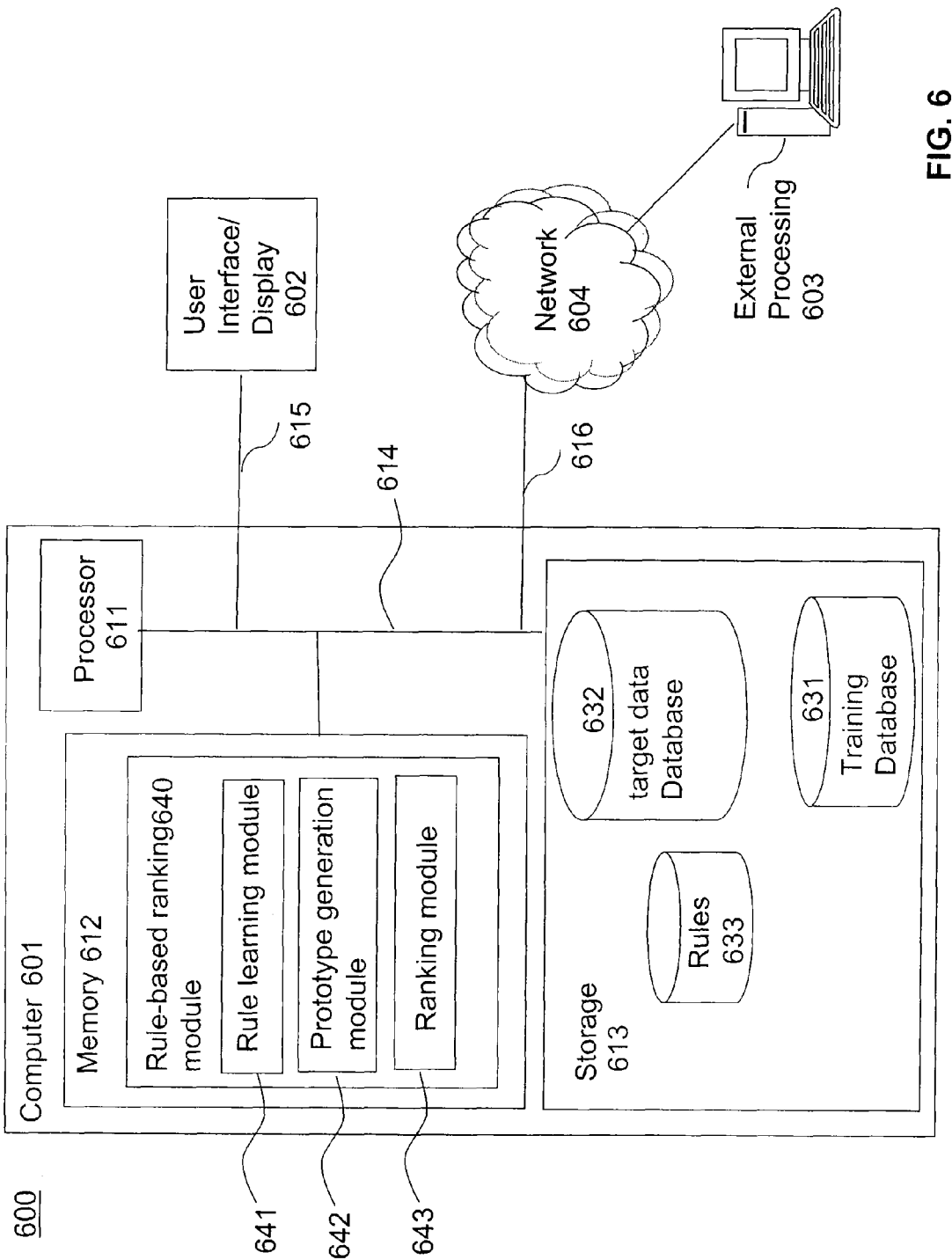
FIG. 6 is a block diagram of a system for ranking target data records using learned rules, according to an embodiment of the present invention.

FIG. 6 illustrates a system 600 for ranking data records using learned rules according to an embodiment of the present invention. A computer 601 having control logic (including the control logic for a rule-based ranking module 640), may be controlled by a user through a user interface/display 602. The user interface/display 602 may be connected to the computer 601 through any suitable connection mechanism 615, including Ethernet, IEEE 802.11, or a local connectivity device such as a Peripheral Component Interconnect (PCI) bus. The user interface/display 602 may be co-located with the computer 601, or be located separately and accessed through one or more networks. The user interface/display 602 may be a graphical user interface and may also be web-accessible. The user interface/display 602 may enable the input of data necessary for system operation, including but not limited to, data for a training database 631, for a rules database 633, for a target data database 632, and/or configuration parameters (not shown) for the rule-based ranking module 640.

Computer 601 may be connected through any suitable connection mechanism 616 including Ethernet, and IEEE 802.11, to a separate external processing entity 603. The external entity 603 may receive, for example, information about matching data entries from the computer 601 and may conduct further analysis. In an embodiment, the training data records of training database 631 as well as target data records in target data database 632 may be pre-processed in external processing entity 603. For example, each training data record may be marked as belonging to a positive class or negative class based on the application, and the target data records may be formatted to comply with a predefined format, by external processing entity 603.

Computer 601 may represent one or more computers. In an embodiment, computer 601 includes one computer in which the control logic processing takes place, including the learning of rules that are written to rules database 633 using training database 631, and the analyzing and ranking of the target data in database 632. In another embodiment, computer 601 may include at least two computers, a first computer in which the control logic exists for the learning of rules that are written to rules database 633 using training database 631, and a second computer that contains the control logic for analyzing and ranking of the target data in database 632. One or more of the computers comprising computer 601 may be a personal computer, a handheld computer, a personal digital assistant, or other device with computing capability. A person skilled in the art will appreciate that the computer 601 may represent multiple computers in which the functionality disclosed herein is distributed.

The computer 601 may include a processor 611, such as a central processor unit (CPU), a memory 612, and storage 613. It will be apparent to a person skilled in the art that other components may be available and necessary for the operation of the computer 601, according to embodiments of the present invention. Processor 611, memory 612 and storage 613 may be connected by a internal bus such as, for example, a PCI bus 614. Bus 614 may also, for example, through network interface devices, facilitate connecting links 615 and 616 to the computer 601. Processor 611 may be any processor capable of executing control logic, including a general purpose CPU. Memory 612 may be a random access memory (RAM). Storage 613 may include one or more of a hard disk, flash memory or other form of permanent or semi-permanent digital data storage.

In one embodiment, memory 612 may include control logic of the rule-based ranking module 640. Rule-based ranking module 640 may include the control logic required to accomplish the learning of rules from training data and ranking of target data using the rules, as taught herein. For example, rule-based ranking module 640 may implement the functionality of process 100 of FIG. 1. As noted above, the control logic of module 640 may be distributed over one or more computers according to embodiments of the present invention. Module 640 may include a rule learning module 641, a prototype generation module 642, and a ranking module 643. Rule learning module 641 may implement, for example, the functionality of step 104 of process 100, to learn rules using training data. Prototype generation module 642 may implement, for example, the functionality of step 106 of process 100, to generate rule prototypes from the rules of rule database 633. Ranking module 643 may implement, for example, the functionality of step 108 of process 100, to rank data in target data database 632.

Storage 613 may include training database 631, target data database 632, and rules 633. Note that the term "database" herein means any collection of data entries with or without an associated database framework or infrastructure. For example and without limitation, training database 631 may be an ASCII text file, or a table in a well known DBMS such as ORACLE. Training database 631 can include training data records that have been pre-processed and marked to indicate whether they belong to a positive class of data records or a negative class of data records based on the application. In the previously mentioned example credit card transaction application, each training data record may represent a credit card transaction and may include many attributes describing the transaction and related transactions or other related details. Rules database 633 contains rules that are learned, for example, using rule learning module 641, from training data records in training database 631. Rules database 633 may also include the rule prototypes generated from rules using, for example, prototype generation module 642. Rules and rule prototypes from rules database 633 can be used to analyze and rank target data records in target data database 632, for example, by ranking module 643.

A person skilled in the art will understand that the various components shown in FIG. 6 are illustrative only, and that there may be embodiments of the present invention that include fewer or greater components and in different arrangements, in accordance with the teachings of this disclosure.

4. Example Computer Embodiment

Figure 7:
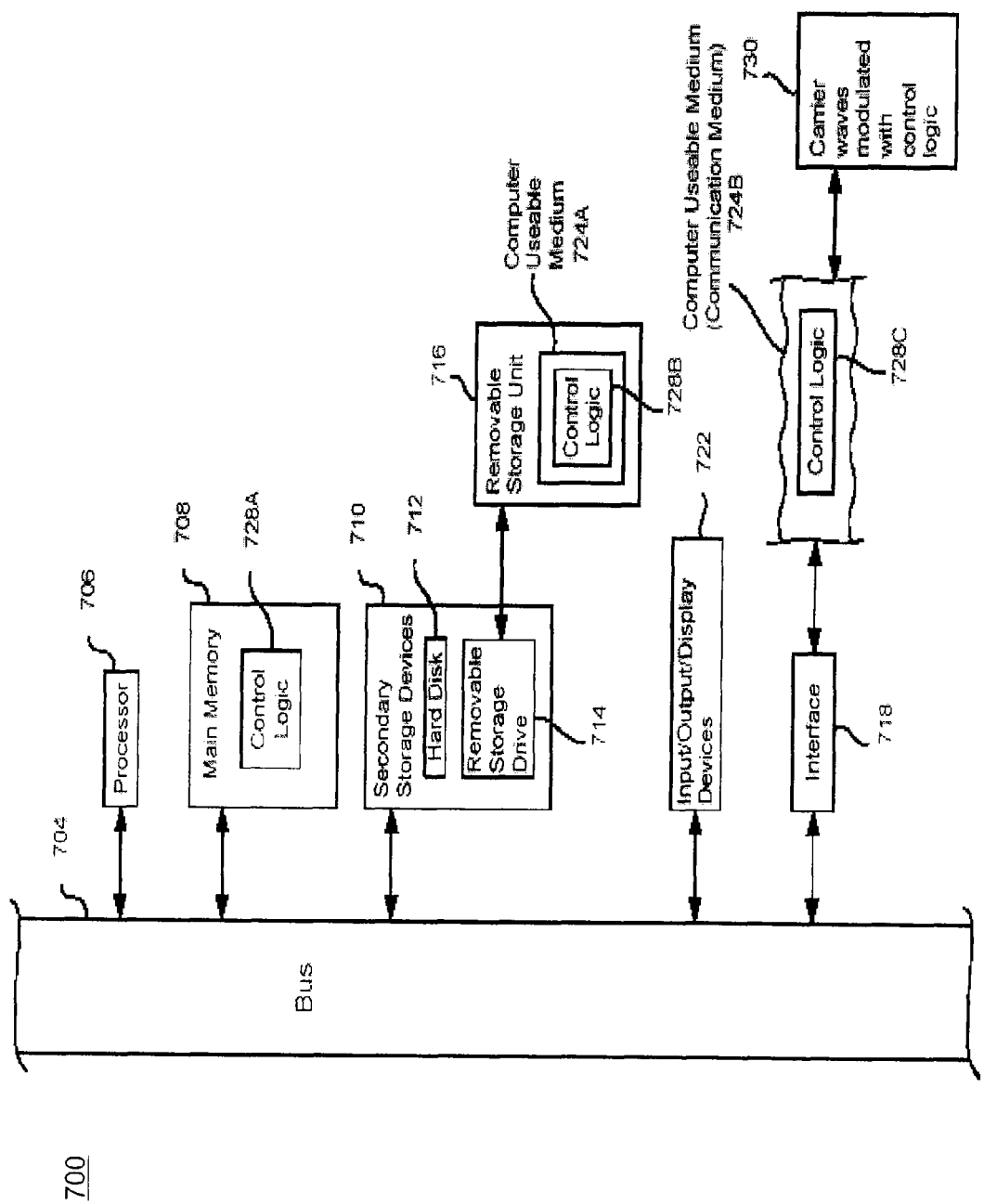
FIG. 7 is an example computer useful for implementing the system and components of an embodiment of the present invention.

In an embodiment of the present invention, the system and components of the present invention described herein are implemented using well known computers, such as computer 700 shown in FIG. 7. For example, rule-based ranking module 640 can be implemented using computer(s) 700.

The computer 702 includes one or more processors (also called central processing units, or CPUs), such as a processor 706. The processor 706 is connected to a communication bus 704.

The computer 702 also includes a main or primary memory 708, such as random access memory (RAM). The primary memory 708 has stored therein control logic 728A (computer software), and data.

The computer 702 may also include one or more secondary storage devices 710. The secondary storage devices 710 include, for example, a hard disk drive 712 and/or a removable storage device or drive 714, as well as other types of storage devices, such as memory cards and memory sticks. The removable storage drive 714 represents a floppy disk drive, a magnetic tape drive, a compact disk drive, an optical storage device, tape backup, etc.

The removable storage drive 714 interacts with a removable storage unit 716. The removable storage unit 716 includes a computer useable or readable storage medium 724 having stored therein computer software 728B (control logic) and/or data. Removable storage unit 716 represents a floppy disk, magnetic tape, compact disk, DVD, optical storage disk, or any other computer data storage device. The removable storage drive 714 reads from and/or writes to the removable storage unit 716 in a well known manner.

The computer 702 may also include input/output/display devices 722, such as monitors, keyboards, pointing devices, etc.

The computer 702 further includes at least one communication or network interface 718. The communication or network interface 718 enables the computer 702 to communicate with remote devices. For example, the communication or network interface 718 allows the computer 702 to communicate over communication networks or mediums 724B (representing a form of a computer useable or readable medium), such as LANs, WANs, the Internet, etc. The communication or network interface 718 may interface with remote sites or networks via wired or wireless connections. The communication or network interface 718 may also enable the computer 702 to communicate with other devices on the same platform, using wired or wireless mechanisms.

Control logic 728C may be transmitted to and from the computer 702 via the communication medium 724B. More particularly, the computer 702 may receive and transmit carrier waves (electromagnetic signals) modulated with control logic 730 via the communication medium 724B.

Any apparatus or manufacture comprising a computer useable or readable medium having control logic (software) stored therein is referred to herein as a computer program product or program storage device. This includes, but is not limited to, the computer 702, the main memory 708, secondary storage devices 710, the removable storage unit 716 and the carrier waves modulated with control logic 730. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

6. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for ranking a target data record set, the method performed using at least one processor, comprising:
   generating a learned rule set from a training data record set, wherein each training record in the training data record set is pre-determined to belong to a class from a plurality of classes, and wherein a learned rule from the learned rule set having one or more rule conditions is associated with one or more training records from the training data record set having attribute values satisfying the one or more rule conditions;
   creating, for each rule in the learned rule set, at least one prototype representing the rule in a multi-dimensional feature space to thereby generate a prototype set wherein each said at least one prototype approximates a point in the multi-dimensional feature space corresponding to an average of values for each feature from training data records associated with the rule; and
   ranking the target data record set using at least the prototype set, wherein the ranking includes assigning a score to at least one target data record in the target data record set based upon a distance in the multi-dimensional feature space from the at least one target data record to at least one prototype from the prototype set.

2. The computer-implemented method of claim 1, wherein the generating step comprises:
   dividing the training data record set into a positive class and a negative class; and
   deriving the learned rule set for the positive class.

3. The computer-implemented method of claim 2, wherein the deriving step comprises:
   learning a learned rule;
   removing from the positive class training data records covered by the learned rule; and
   adding the learned rule to the learned rule set.

4. The computer-implemented method of claim 3, wherein the learning step comprises:
   (a) forming a projected rule for the positive class, wherein the projected rule is of substantially highest generality;
   (b) adding the projected rule to a set of projected rules;
   (c) refining each of a plurality of rules in the set of projected rules by adding one or more of a condition or a range restriction;
   (d) filtering to retain a predetermined number of rules in said set of projected rules; and
   (e) selecting a select learned rule, wherein the select learned rule is a rule having a substantially highest F-measure among rules in the set of projected rules.

5. The computer-implemented method of claim 4, wherein the filtering step is based on a F-measure of rules in said set of projected rules.

6. The computer-implemented method of claim 4, wherein the refining step comprises, for each rule in the set of projected rules:
   removing said each rule from the set of projected rules;
   specializing said each rule by adding at least one condition or at least one range restriction to said each rule to generate one or more refined rules;

testing each of the one or more refined rules using one or more predetermined statistical measures; and adding said each of the one or more refined rules to the set of projected rules based on results of the testing step.

7. The computer-implemented method of claim 6, wherein the one or more predetermined statistical measures include a minimum recall parameter.

8. The computer-implemented method of claim 7, wherein the minimum recall parameter measures coverage of the positive class.

9. The computer-implemented method of claim 6, wherein the one or more predetermined statistical measures include a minimum precision parameter.

10. The computer-implemented method of claim 9, wherein the minimum precision parameter measures coverage of the positive class and the negative class.

11. The computer-implemented method of claim 4, wherein in step (a) the generality of the projected rule includes evaluation of the positive class and the negative class.

12. The computer-implemented method of claim 1, wherein each said at least one prototype includes a vector comprising a plurality of numeric elements each corresponding to a numeric attribute of a role.

13. The computer-implemented method of claim 12, wherein each said at least one prototype includes a positive prototype or both of a positive prototype and a negative prototype, wherein the positive prototype covers training data records in the positive class and the negative prototype covers training data records in the negative class.

14. The computer-implemented method of claim 1, wherein the ranking step comprises:
applying at least one rule from the learned rule set and at least one rule prototype from the prototype set to each data record from the target data record set, wherein a score is assigned to said each data record; and
selecting a data record from the target data record set based on scores assigned to data record in said target data record set.

15. The computer-implemented method of claim 14, wherein the applying step comprises:
(a) choosing a data record from the target data record set;
(b) choosing a rule from the learned rule set;
(c) assigning a rule score to the chosen data record based on one or more prototypes of said chosen rule, wherein the one or more prototypes are from the prototype set;
(d) repeating steps (b)-(c) for a plurality of rules from said learned rule set;
(e) determining a score for the chosen data record based on a plurality of rule scores assigned to the chosen data record; and
(f) repeating steps (a)-(e) for a plurality of data records from said target data record set.

16. A system for ranking a target data record set, comprising:
a processor;
a rule learning module executed on the processor and configured to generate a learned rule set from a training data record set, wherein each training record in the training data record set is pre-determined to belong to a class from a plurality of classes, and wherein a learned rule from the learned rule set having one or more rule conditions is associated with one or more training records from the training data record set having attribute values satisfying the one or more rule conditions;
a rule prototype generation module executed on the processor and configured to create a prototype set, wherein the prototype set comprising for each rule in the learned rule set, at least one prototype representing the rule in a multi-dimensional feature space, and wherein each said at least one prototype approximates a point in the multi-dimensional feature space corresponding to an average of values for each feature from training data records associated with the rule; and
a scoring module executed on the processor and configured to rank the target data record set using at least the prototype set, wherein the ranking includes assigning a score to at least one target data record in the target data record set based upon a distance in the multi-dimensional feature space from the at least one target data record to at least one prototype from the prototype set.

17. A non-transitory computer readable storage medium having computer program logic recorded thereon for enabling a processor to rank a target data record set, said computer program logic comprising:
a rule learning module to enable a processor to generate a learned rule set from a training data record set, wherein each training record in the training data record set is pre-determined to belong to a class from a plurality of classes, and wherein a learned rule from the learned rule set having one or more rule conditions is associated with one or more training records from the training data record set having attribute values satisfying the one or more rule conditions;
a rule prototype generation module to enable a processor to create a prototype set, wherein the prototype set comprises, for each rule in the learned rule set, at least one prototype representing the rule in a multi-dimensional feature space, and wherein each said at least one prototype approximates a point in the multi-dimensional feature space corresponding to an average of values for each feature from training data records associated with the rule; and
a scoring module to enable a processor to rank the target data record set using the at least the prototype set, wherein the ranking includes assigning a score to at least one target data record in the target data record set based upon a distance in the multi-dimensional feature space from the at least one target data record to at least one prototype from the prototype set.

18. The computer-implemented method of claim 15, wherein the rule score is determined based upon distances from the chosen data record to respective ones of the one or more prototypes.

19. The computer-implemented method of claim 18, wherein the rule score is determined based upon a positive prototype of the one or more prototypes and a negative prototype of the one or more prototypes.

20. The system of claim 16, wherein each said at least one prototype includes a positive prototype or both of a positive prototype and a negative prototype, wherein the positive prototype covers training data records in the positive class and the negative prototype covers training data records in the negative class.

21. The non-transitory computer readable storage medium of claim 17, wherein the scoring module is further configured to:
apply at least one rule from the learned rule set and at least one rule prototype from the prototype set to each data record from the target data record set, wherein a score is assigned to said each data record; and
select a data record from the target data record set based on scores assigned to data record in said target data record set.

22. The non-transitory computer readable storage medium of claim 17, wherein each said at least one prototype includes a positive prototype or both of a positive prototype and a negative prototype, wherein the positive prototype covers training data records in the positive class and the negative prototype covers training data records in the negative class.

23. The system of claim 16, wherein the ranking further includes:
   applying at least one rule from the learned rule set and at least one rule prototype from the prototype set to each data record from the target data record set, wherein a score is assigned to said each data record; and
   selecting a data record from the target data record set based on scores assigned to data record in said target data record set.

\* \* \* \* \*